US008825355B2

(12) United States Patent
Nakano et al.

(10) Patent No.: US 8,825,355 B2
(45) Date of Patent: *Sep. 2, 2014

(54) LANE DEPARTURE CONTROL SYSTEM

(71) Applicant: Denso Corporation, Kariya (JP)

(72) Inventors: Takahito Nakano, Kariya (JP); Junpei Tatsukawa, Chiryu (JP)

(73) Assignee: Denso Corporation, Kariya (JP)

( * ) Notice: Subject to any disclaimer, the term of this patent is extended or adjusted under 35 U.S.C. 154(b) by 68 days.

This patent is subject to a terminal disclaimer.

(21) Appl. No.: 13/746,656

(22) Filed: Jan. 22, 2013

(65) Prior Publication Data

US 2013/0190985 A1 Jul. 25, 2013

(30) Foreign Application Priority Data

Jan. 25, 2012 (JP) ................................. 2012-013278

(51) Int. Cl.
*B62D 5/04* (2006.01)
*B62D 15/02* (2006.01)
*B62D 6/00* (2006.01)
(52) U.S. Cl.
CPC ............... *B62D 6/00* (2013.01); *B62D 15/025* (2013.01); *B62D 6/003* (2013.01)
USPC .............................. 701/118; 701/41; 180/422
(58) Field of Classification Search
USPC ...................................... 701/118, 41; 180/422
See application file for complete search history.

(56) References Cited

U.S. PATENT DOCUMENTS 6,338,022 B1 1/2002 Shinmura et al.
2004/0060765 A1* 4/2004 Mattson et al. ............... 180/422

FOREIGN PATENT DOCUMENTS

| JP | 2001-001925 | 1/2001 |
| JP | 2003-182552 | 7/2003 |
| JP | 2003-327151 | 11/2003 |
| JP | 2006-282063 | 10/2006 |

OTHER PUBLICATIONS

Office action dated Dec. 17, 2013 in corresponding Japanese Application No. 2013-010423.
Office action dated Mar. 11, 2014 in corresponding Japanese Application No. 2013-010423.

* cited by examiner

*Primary Examiner* — Mary Cheung
*Assistant Examiner* — Yuen Wong
(74) *Attorney, Agent, or Firm* — Harness, Dickey & Pierce, P.L.C.

(57) ABSTRACT

A lane departure control system is provided which works to control a lane departure of a vehicle. When the vehicle is expected to unintentionally leave a lane of a road, the system steers the vehicle toward the center of the lane at a first yaw rate. Afterwards, when the vehicle is determined to be traveling toward a virtual line extending parallel to the boundary line, the system directs the vehicle parallel to the virtual line at a second yaw rate. The system keeps an absolute value of the first yaw rate below a first upper limit and also keeps an absolute value of the second yaw rate below a second upper limit that is less than the first upper limit. This provides an improved comfortable ride to a driver of the vehicle when the vehicle is directed parallel to the virtual line.

9 Claims, 10 Drawing Sheets

R_Yr=V*1/R REQUIRED BY
VEHICLE TO ROUND A CURVE

CURVATURE 1/R [1/m]
VEHICLE SPEED V [m/s]

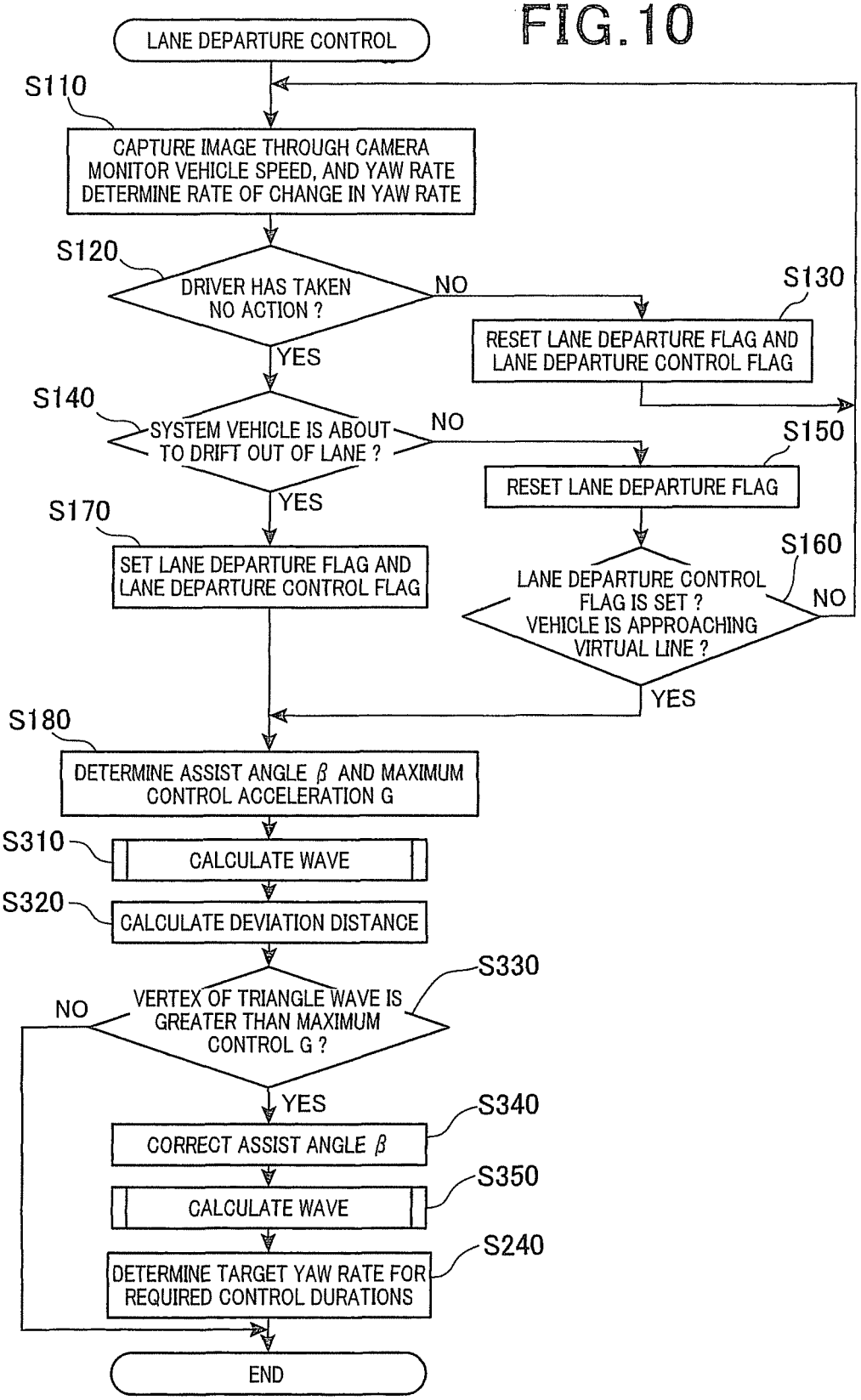

V = 100 [km/h], α = 1 [deg]

LANE DEPARTURE CONTROL SYSTEM

CROSS REFERENCE TO RELATED DOCUMENT

The present application claims the benefit of priority of Japanese Patent Application No. 2012-13278 filed on Jan. 25, 2012, the disclosure of which is incorporated herein by reference.

BACKGROUND OF THE INVENTION

1. Technical Field

This disclosure relates generally to a lane departure control system for vehicles which works to minimize the departure of a vehicle from its intended traveling zone, and more particularly to such a lane departure control system designed to control steering of the vehicle at a controlled yaw rate.

2. Background Art

Japanese Patent Publication No. 3800087 issued on May 12, 2006 teaches a lane departure prevention system for automotive vehicles which works to automatically steer the vehicle toward the center of a traveling lane thereof in a first steering control mode when the vehicle is determined to be likely to move out of the lane and then steer the vehicle in the opposite direction to keep the vehicle within the lane in a second steering control mode.

The lane departure prevention system is designed to steer the vehicle rapidly a relatively great degree of target yaw moment in each of the first and second steering modes in order to return the vehicle to a desired heading direction quickly. This may cause the vehicle to be swung greatly in a lateral direction in each of the first and second steering control modes, thus giving vehicle occupants an uncomfortable ride.

SUMMARY

It is therefore an object to provide a lane departure control system engineered to be simple in operation to control the departure of a vehicle from a desired traveling area in safe and comfortable riding conditions.

According to one aspect of the invention, there is provided a lane departure control apparatus for controlling a lane departure of a vehicle using a steering mechanism. The lane departure control apparatus comprises: (a) an angle determiner which determines a controlled angle that is an angle between a direction in which a vehicle equipped with this apparatus is now heading within a given area of a lane on a road and a target angular direction in which the vehicle is to be pointed, the angle determiner also determining a correction angle that is an angle between a direction in which the vehicle is now pointing and a virtual line, the virtual line being defined to extend parallel to a lane boundary of the lane; and (b) a lane departure controller engineered to operate in a first steering control mode and a second steering control mode following the first steering control mode. When the vehicle is determined to be about to unintentionally deviate from the given area of the lane, the lane departure controller enters the first steering control mode to acquire the controlled angle from the angle determiner and output a control signal to the steering mechanism to steer the vehicle toward a center of the given area of the lane by the controlled angle at a first yaw rate. When the vehicle is determined to be traveling toward the virtual line, the lane departure controller enters the second steering control mode to acquire the correction angle from the angle determiner and output a control signal to the steering mechanism to steer the vehicle by the correction angle to orient the vehicle parallel to the virtual line at a second yaw rate. The lane departure controller keeps an absolute value of the first yaw rate below a first upper limit in the first steering control mode and also keeps an absolute value of the second yaw rate below a second upper limit that is less than the first upper limit in the second steering control mode. This provides an improved comfortable ride to the driver of the vehicle when the vehicle is directed parallel to the virtual line.

In the preferred mode of the embodiment, the lane departure controller may calculate a deviation angle between the direction in which the vehicle is pointing and a boundary line which is provided to define the given area of the lane and also calculate an assist angle between the target angular direction of the vehicle in the first steering control mode and the boundary line. The correction angle is set to the sum of the deviation angle and the assist angle. This facilitates the ease of making a schedule of controlling the steering of the vehicle.

The lane departure control apparatus may also include an electric power steering device which works as the steering mechanism to steer the vehicle in response to each of the control signals outputted form the lane departure controller.

The lane departure control apparatus may further include an image capturing device which works as the angle determiner to capture an image of a road surface in a heading direction of the system vehicle to determine the controlled angle.

When the vehicle is expected to unintentionally leave the boundary line, the lane departure controller may acquire an instantaneous value of a yaw rate of the vehicle to determine a yaw rate offset that is the instantaneous value of the yaw rate minus a curving yaw rate, and mathematically draw a wave in a Cartesian coordinate system defined by a first coordinate axis representing time and a second coordinate axis representing a target value of the first yaw rate at which the vehicle is to be steered. The curving yaw rate is a yaw rate of the vehicle which is required to curve around the boundary line and which is zero when the vehicle is running straight along the boundary line. The wave is defined to extend from a first point indicating the yaw rate offset and terminate at a second point where the target value of the first yaw rate becomes the curving yaw rate and also formed so that a value of integral of the target value of the first yaw rate over a lane departure control duration for which the vehicle is to be steered in the first steering control mode will be the controlled angle. The lane departure controller steers the vehicle at the target value of the first yaw rate which changes according to the wave. This results in simplified operation of the lane departure controller to control the steering of the vehicle toward the center of the lane.

The wave may be designed to include at least two straight segments: a first segment indicating the target value of the first yaw rate which is increased at a constant rate, and a second segment indicating the target value of the first yaw rate which is decreased at a constant rate.

When the vehicle is expected to unintentionally leave the boundary line, the lane departure controller may also be designed to acquire an instantaneous value of the yaw rate of the vehicle to determine the yaw rate offset and mathematically draw a wave in the Cartesian coordinate system defined by a first coordinate axis representing time and a second coordinate axis representing a target value of the second yaw rate at which the vehicle is to be steered. The wave is defined to extend from a first point indicating the yaw rate offset and terminate at a second point where the target value of the second yaw rate becomes the curving yaw rate and also formed so that a value of integral of the target value of the second yaw rate over a lane departure control duration for which the vehicle is to be steered in the second steering control mode will be the correction angle. The lane departure controller steers the vehicle at the target value of the second yaw rate which changes according to the wave. This results in simplified operation of the lane departure controller to control the steering of the vehicle to make the vehicle run parallel to the virtual line. The wave may be designed to include at least two straight segments: a first segment indicating the target value of the second yaw rate which is increased at a constant rate, and a second segment indicating the target value of the second yaw rate which is decreased at a constant rate.

According to another aspect of the embodiment, there is provided a computer-readable recording medium which stores programs for configuring a computer system as the lane departure controller of the lane departure control apparatus, as described above.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 10 is a flowchart of a lane departure control program according to the second embodiment;

DESCRIPTION OF THE PREFERRED EMBODIMENTS

Figure 1A:
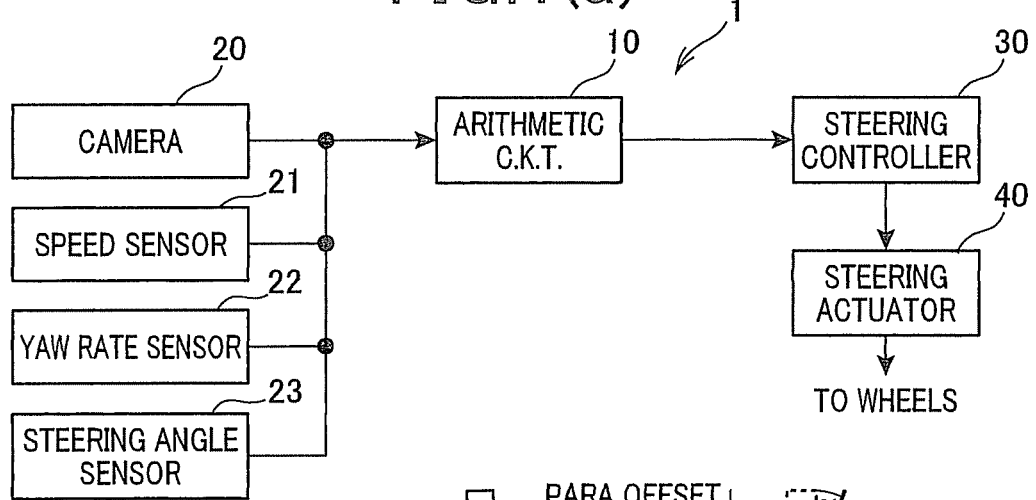
FIG. 1(a) is a block diagram which illustrates a lane departure control system according to the first embodiment.

Referring to the drawings, wherein like reference numbers refer to like parts in several views, particularly to FIG. 1(a), there is shown a lane departure control system 1 for vehicles such as automobiles according to the first embodiment which may be used with a lane departure warning system.

In use, the lane departure control system 1 is mounted in a vehicle such as a passenger car and designed to keep that vehicle (which will also be referred to as a system vehicle below) within a traveling area or lane usually defined by right and left boundaries (i.e., lane lines) on a road.

The lane departure control system 1 is equipped with an arithmetic circuit 10, a camera 20, a vehicle speed sensor 21, a yaw rate sensor 22, a steering angle sensor 23, and a steering controller 30.

The arithmetic circuit 10 is implemented by a typical microcomputer equipped with a CPU, a ROM, a RAM, etc. and works as a lane departure controller to execute logic programs including a lane departure control program, as stored in the ROM, to perform given tasks such as control of departure of the system vehicle from its traveling lane. The arithmetic circuit 10 also works to acquire an image, captured by the camera 20, to calculate a target yaw rate that is a target value of an angular velocity that is the rate of change in angular displacement of the system vehicle in a direction in which the system vehicle is steered (which will also be referred to as a steering angular velocity below).

The camera 20 serves to take an image of a road surface in a traveling direction of the system vehicle and calculate a heading angle (which will also be referred to as a deviation angle below) that is an angle which a direction (also called a traveling direction below) in which the system vehicle is now heading makes with a lane boundary (i.e., a lane boundary line or lane marking) of a lane on the road on which the system vehicle is now running. The lane boundary, as referred to herein, contains the meaning of a boundary line used to delimit a given area of the lane within which the system vehicle is permitted to travel and, thus, includes in the meaning a virtual line (i.e., an imaginary line handled in the camera 20 and the arithmetic circuit 10) drawn inside the lane a given distance (e.g., 1 m) away from the lane boundary. The deviation angle, as referred to in this disclosure, therefore, includes a correction angle in the meaning referred to in this application. The correction angle is, as described later in detail, an angle between the traveling direction of the system vehicle and the virtual line. The camera 20 also works to calculate a distance between the system vehicle and the lane boundary, and a radius of a curve on the road using known road line recognition techniques. The camera 20 outputs such parameters to the arithmetic circuit 10 as image data. The camera 20 may alternatively be designed to perform only an image capturing function, while the arithmetic circuit 10 may be engineered to process or calculate the image data therein. Consequently, the camera 20 itself or a combination of the camera 20 and the arithmetic circuit 10 serves as a calculator or an angle determiner to determine parameters such as the deviation angle, the correction angle, etc., from the image data in image processing techniques well known in the art.

The vehicle speed sensor 21 is implemented by a typical vehicle speed sensor and measures the speed of the system vehicle to output it to the arithmetic circuit 10. The yaw rate sensor 22 is implemented by a typical yaw rate sensor and measures an angular velocity of the system vehicle. The steering angle sensor 23 is implemented by a known steering angle sensor and measures a steered angle of, for example, a steering wheel, to output it to the arithmetic circuit 10.

The steering controller 30 works as both a calculator to calculate a target steering angle vehicle is required to achieve the target yaw rate (i.e., the target angular velocity) of the system vehicle, as derived in the arithmetic circuit 10, and a controller to instruct a steering actuator 40 (i.e., a steering mechanism) such as a typical electric power steering device to produce a degree of steering torque required to achieve the target steering angle. Specifically, the steering controller 30 determines the target steering angle per unit time in terms of steering torque which corresponds to the target yaw rate, as inputted from the arithmetic circuit 10, by look up using a steering angle-to-yaw rate map stored in a memory such as the ROM and also steer the system vehicle through the target steering angle. The steering actuator 40 may alternatively be implemented by a brake system designed to control a degree of braking pressure to be exerted on either of the right and left wheels to steer the system vehicle to the right or left. This technique is well known in the art, and explanation thereof in detail will be omitted here.

The steering controller 30 may be designed to determine the target steering angle directly or a parameter that is a function of the target steering angle indirectly by applying the target yaw rate to an equivalent two-wheel vehicle model.

The steering controller 30, therefore, works as the lane departure controller together with the arithmetic circuit 10.

Figure 1B:
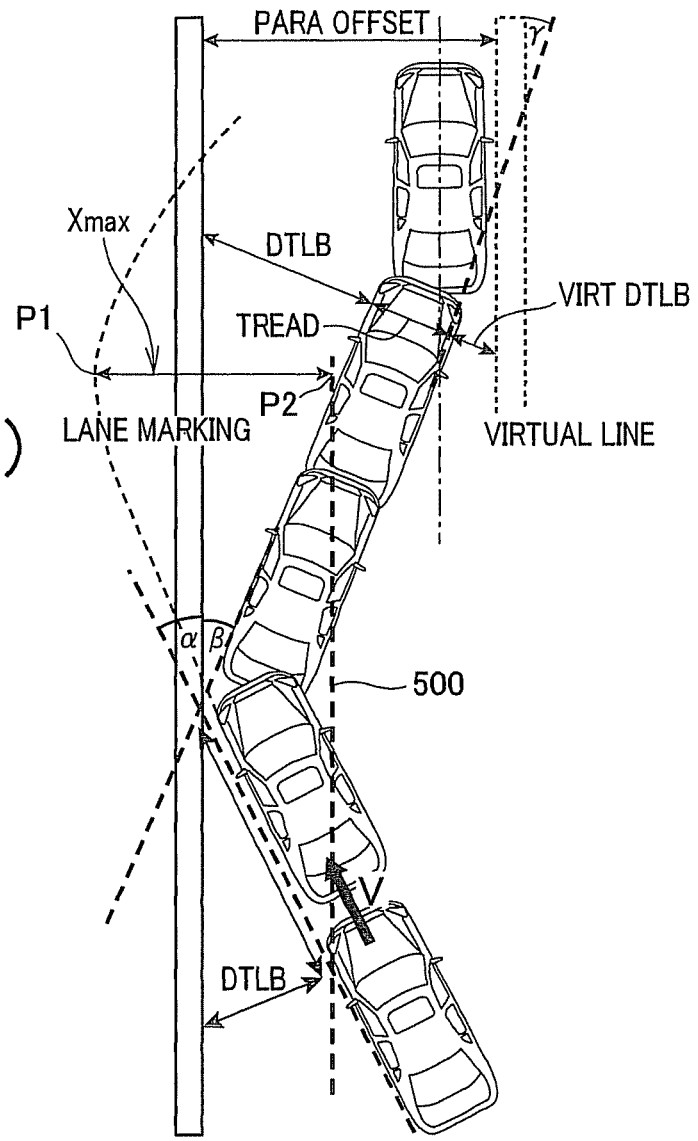
FIG. 1(b) is a bird's-eye view which illustrates an overview of a lane departure control operation made by the lane departure control system of FIG. 1(a)
Figure 2:
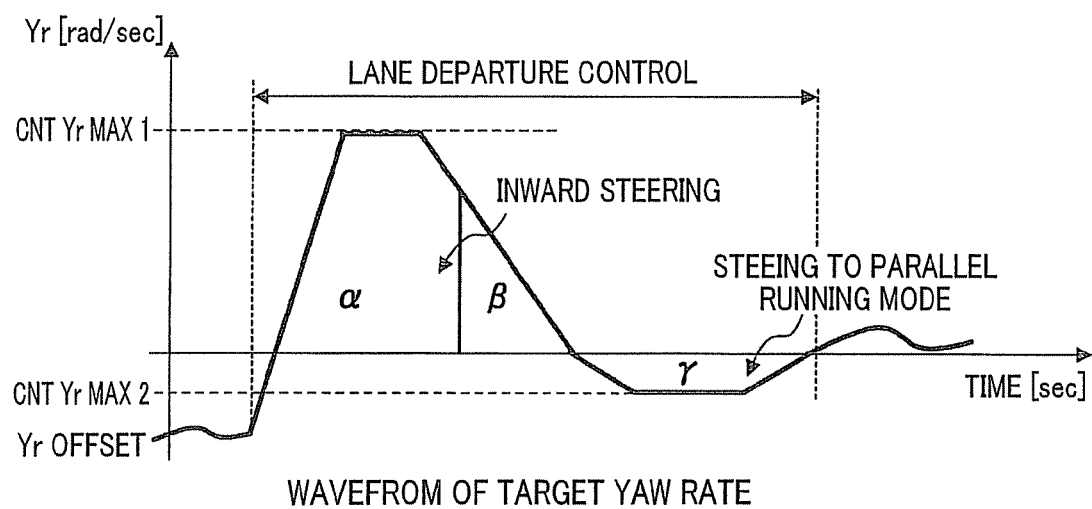
FIG. 2 is a graph which demonstrates a change in target yaw rate with time which is set by an arithmetic circuit of the lane departure control system of FIG. 1(a)

FIG. 1(b) is a bird's-eye view which illustrates an overview of the lane departure control operation made by the lane departure control system 1. FIG. 2 is a graph which demonstrates a change in target yaw rate with time which is set by the arithmetic circuit 10. For example, when determining the system vehicle, as illustrated in FIG. 1(b), as unintentionally approaching the left lane boundary (e.g., a white lane marking on the road), the lane departure control system 1 enters a first steering control mode and works to determine whether there is a possibility that the system vehicle 1 will deviate from the left lane boundary in a short time or not. If it is determined that such a possibility is high, the lane departure control system 1 changes the traveling direction of the system vehicle inside the lane (i.e., toward the center of the lane) by a controlled angle ($\alpha+\beta$) that is the sum of the deviation angle $\alpha$ and an assist angle $\beta$ where the deviation angle $\alpha$ in the example of FIG. 1(b) is an angle which the traveling direction of the system vehicle makes with the left lane boundary, and the assist angle $\beta$ is an angle which a target angular direction in which the system vehicle is to be pointed makes with the left lane boundary.

Subsequently, the lane departure control system 1 then enters a second steering control mode to acquire the correction angle $\gamma$ (i.e., a last steering angle) and corrects the traveling direction of the system vehicle, that is, returns the traveling direction of the system vehicle to the left by the correction angle $\gamma$ to direct the system vehicle substantially parallel to the virtual line. The correction angle $\gamma$ is an angle between the traveling direction of the system vehicle makes and the virtual line defined on the road a given distance away from the right boundary line of the lane. Note that the center of the lane, as referred to above, is not necessarily the exact center of the lane on which the system vehicle is running, but may be any point on the road to which the system vehicle is to be directed by the lane departure control system 1 to minimize or eliminate the probability of the lane departure.

The virtual line is a line defined at a given distance away from the right boundary in the example of FIG. 1(b) where drivers should keep to the left side of the road. The distance between the system vehicle and the virtual line is determined by measuring the distance between the system vehicle and the right boundary line through the camera 20. In the way, as described above, the lane departure control system 1 determines, as illustrated in FIG. 2, the target yaw rate at which the system vehicle is steered.

Figure 3:
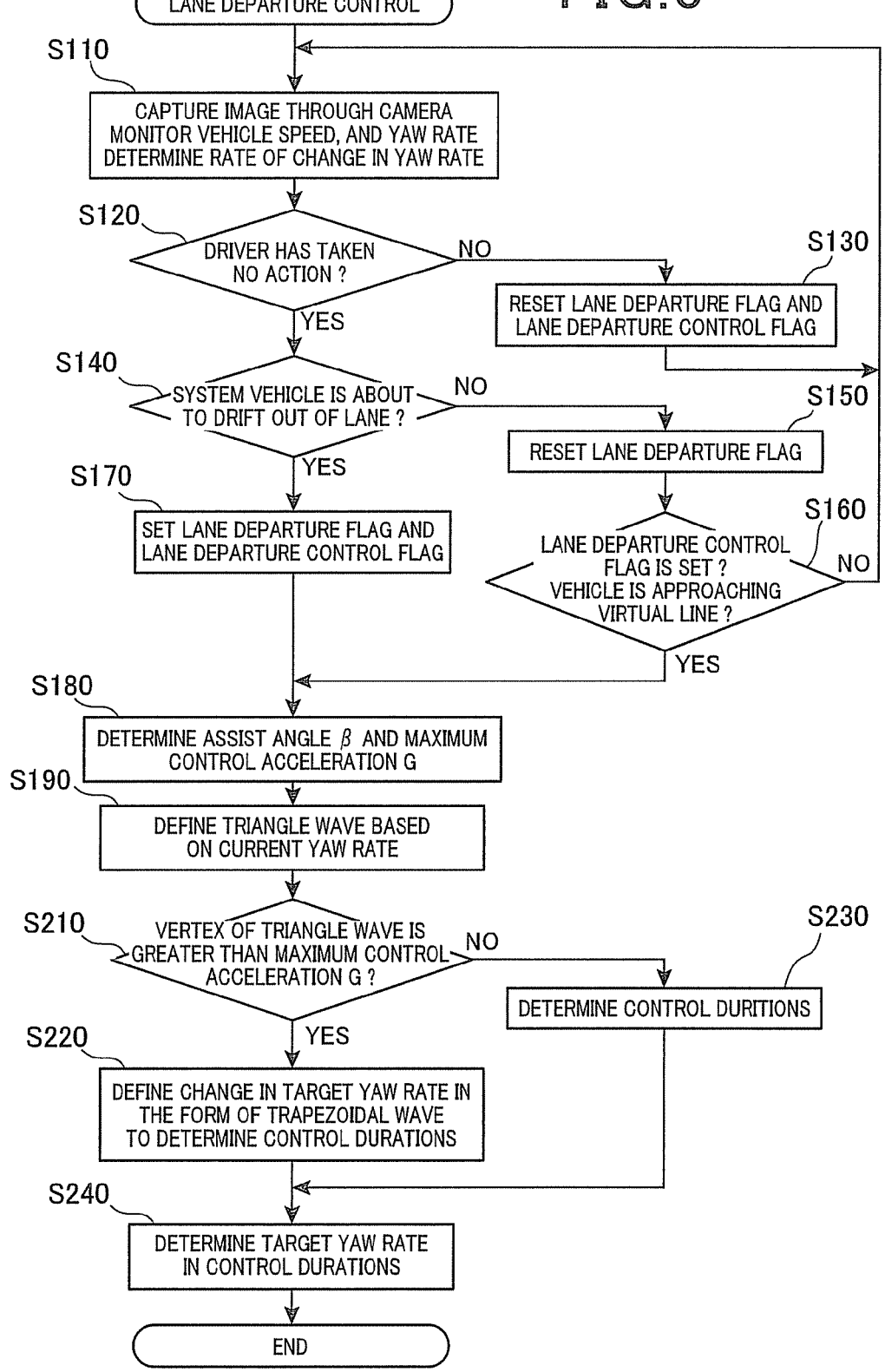
FIG. 3 is a flowchart of a lane departure control program to be executed by the lane departure control system of FIG. 1(a) to determine a target yaw rate at which a vehicle equipped with this system is steered to minimize the probability of lane departure thereof.

FIG. 3 is a flowchart of a lane departure control program to be executed by the arithmetic circuit 10 to determine the target yaw rate (i.e., the target angular velocity) at which the system vehicle is steered to minimize the probability of lane departure thereof.

The lane departure control program is initiated upon turning on of the lane departure control system 1 and executed at an interval of, for example, 50 ms.

First, in step S110, an image captured by the camera 20 is derived. Outputs of the vehicle speed sensor 21 and the yaw rate sensor 22 are sampled to determine instantaneous values of the yaw rate and the speed of the system vehicle. A target rate of change in yaw rate is also calculated.

The target rate of change in yaw rate is the rate at which the target yaw rate is to be changed when it is required to eliminate or control the lane departure of the system vehicle (i.e., when a lane departure flag, as will be described later in detail, is being set). Specifically, the target rate is determined at which the target yaw rate is to be increased or decreased either in a lane departure control mode (i.e., the first steering control mode) in which the lane departure control system 1 works to control the lane departure of the system vehicle, i.e., the deviation from the road (which will also be referred to as a departure-controlling increase change rate or a departure-controlling decrease change rate below) or in a parallel-running control mode (i.e., the second steering control mode) in which the lane departure control system 1 works to steer the system vehicle to run parallel to the virtual line, i.e., when the lane departure flag is not being set (which will also be referred to as a parallel-running increase change rate or a parallel-running decrease change rate below). The target rate of change in yaw rate is given by a slope of either of discrete segments of a target yaw rate curve which is mathematically or logically defined to express a relation between a control duration and a required value (i.e., a target value) of the yaw rate, as will be described later in detail.

The absolute value of the parallel-running decrease change rate is selected to be smaller than or equal to that of the parallel-running increase change rate. The absolute value of the parallel-running increase change rate is selected to be smaller than or equal to that of the departure-controlling decrease change rate. The absolute value of the departure-controlling decrease change rate is selected to be smaller than or equal to that of the departure-controlling increase change rate.

After step S110, the routine proceeds to step S120 wherein it is determined whether the operator or driver of the system vehicle has taken no action or not. Specifically, it is determined whether the driver has turned the steering wheel to move the system vehicle away from the lane boundary to which the system vehicle has approached until now or not. This determination is made by monitoring an output of the steering angle sensor 23 in a cycle.

If a NO answer is obtained meaning that the drive is taking or has taken the above action, then the routine proceeds to step S130 wherein the lane departure flag which indicates that is a high probability that the system vehicle will drift or deviate from the lane (i.e., a traveling area delimited by right and left lane boundaries including the virtual line) and a lane departure control flag which indicates that the lane departure control system 1 is in the lane departure control mode are both reset or cleared. The routine then returns back to step S110. The operation in step S130 inhibits the operation of the lane departure control system 1 and permits the driver to control the motion of the system vehicle manually.

Alternatively, if a YES answer is obtained in step S120 meaning that the driver has taken no action intentionally, then the routine proceeds to step S140 wherein it is determined whether the system vehicle will deviate from the lane within a reference period of time (e.g., 2 sec.) or not. Specifically, the lane departure control system 1 calculates the time (also called TLC (Time to Line Crossing)) it takes the system vehicle to reach the lane boundary based on the deviation angle α, the distance to the lane boundary, and the current speed of the system vehicle and determines whether such a time is within the reference period of time or not. How to calculate TLC is well known in the art, and explanation thereof in detail will be omitted here.

If a NO answer is obtained in step S140 meaning that the system vehicle will not cross the lane boundary within the reference period of time, then the routine proceeds to step S150 wherein the lane departure flag is reset. The routine proceeds to step S160 wherein it is determined whether the lane departure control flag is set or not and whether the system vehicle is now approaching the virtual line or not. The latter determination is made, like in step S140, by determining whether the system vehicle will reach the virtual line within a reference period of time (e.g., 1.5 sec.) or not.

If a NO answer is obtained in step S160 meaning that the lane departure control flag is reset or the system vehicle will not cross the virtual line, the routine returns back to step S110. Alternatively, if a YES answer is obtained meaning that the lane departure control flag is being set, and the system vehicle is about to reach the virtual line, then the routine proceeds to step S180, as will be described later.

If a YES answer is obtained in step S140 meaning the system vehicle is estimated to cross the lane boundary within the reference period of time, then the routine proceeds to step S170 wherein the lane departure flag and the lane departure control flag are both set. After step S170, the routine proceeds to step S180 wherein the assist angle $\beta$ is calculated, and a maximum control acceleration G, as will be described later in detail, is determined in terms of angular velocity. Note that the maximum control acceleration G, as referred to in this embodiment, is an upper limit of lateral acceleration of automotive vehicles specified, for example, in safety requirements. How to determine the assist angle $\beta$ will be described with reference to FIG. 4. Similarly, if a YES answer is obtained in step S160, then the routine proceeds to step S180, but the assist angle $\beta$ is not calculated, the correction angle γ is processed as the deviation angle α, and the upper limit of the lateral acceleration of the system vehicle used in calculating the target yaw rate when the system vehicle is to be directed parallel to the virtual line is, as described later in detail, selected to be smaller than a value corresponding to the maximum control acceleration G.

Figure 4:
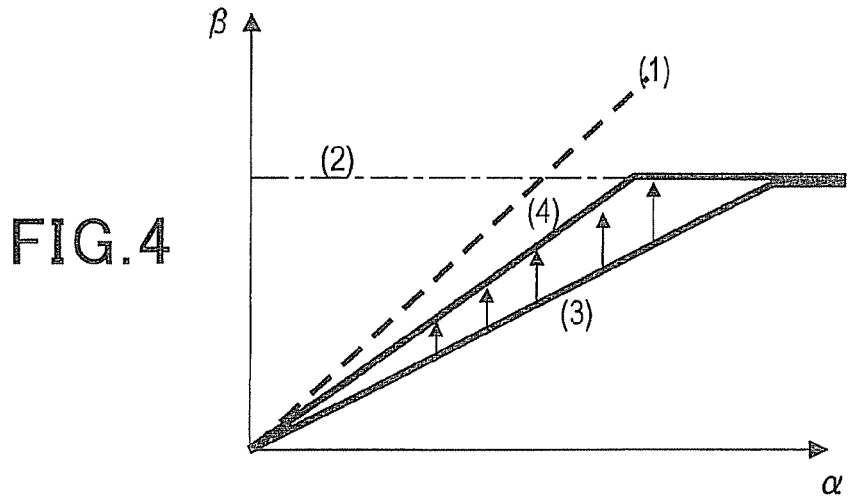
FIG. 4 is a graph which demonstrates a relation between a deviation angle α and an assist angle β for use in steering a vehicle equipped with the lane departure control system of FIG. 1(a)

FIG. 4 is a graph which demonstrates a relation between the deviation angle α and the assist angle $\beta$. The determination of the assist angle $\beta$ may be made by a variety of approaches. For instance, the assist angle $\beta$ may be, as indicated by a broken line (1) in FIG. 4, set smaller than the deviation angle α in order to eliminate an unnatural control operation in which the speed at which the system vehicle is approaching the lane boundary is slow, but the speed at which the system vehicle is returned back to the center of the lane is very high.

Alternatively, the assist angle $\beta$ may be, as indicated by a dashed line (2) in FIG. 4, set constant in order to reduce the load on the arithmetic circuit 10 in calculating the assist angle $\beta$. The assist angle $\beta$ may also be, as indicated by a solid line (3) in FIG. 4, so determined as to increase according to a linear function of the deviation angle α until an upper limit is reached. This gives the driver of the system vehicle the impression that the system vehicle hits a damper or cushion placed near the boundary line so that the impact is absorbed slowly and is then rebounded toward the center of the lane.

If the system vehicle is steered at the controlled angle (i.e., α+$\beta$), but expected to drift out of the boundary line, the assist angle $\beta$ may be, as indicated by a solid line (4) in FIG. 4, set greater than that, as indicated by the solid line (3) with an increase in distance (which will also be referred below to as a lane departure distance) between locations P1 and P2, as illustrated in FIG. 1(b). The location P1 is expressed by the vertex (i.e., a leftmost point) of a track or locus along which the system vehicle (e.g., an outside one of front wheels of the system vehicle) is expected to move when steered through the controlled angle now determined. The location P2 is an intersection of a line drawn from the location P1 perpendicular to the lane boundary (or the virtual line) or a direction in which the system vehicle is to be pointed positively under the lane departure control and a line 500 drawn through the current position of the system vehicle (e.g., the outside front wheel of the system vehicle) parallel to the lane boundary (i.e., the direction in which the system vehicle is to be pointed positively). In other words, the lane departure distance is an interval in the widthwise direction of the lane between the current position of the system vehicle (e.g., the outside front wheel) and a future position of the system vehicle which is estimated to be away at a maximum distance from the line 500 if the system vehicle continues to be steered through the controlled angle now determined. The determination of the assist angle $\beta$ along the line (4) minimizes the degree of lane departure of the system vehicle and causes the system vehicle to move back toward the center of the lane quickly, thereby providing a sense of safety to the driver.

When the lane departure flag is reset, that is, after step S150, the assist angle $\beta$ is set to zero (0) in the following steps. In other words, the correction angle γ is, as described above, determined as a target controlled variable (i.e., the controlled angle=correction angle γ) for use in steering the system vehicle in the second steering control mode to direct the system vehicle parallel to the virtual line.

The maximum control acceleration G which, as described above, corresponds to the upper limit of the target angular velocity of the system vehicle may be determined to have either of values different between when the road or lane on which the system vehicle is running is straight (e.g., when the radius of a curve of the road is greater than or equal to 3,000 m) and when the lane is curved. For instance, when the lane (i.e., the lane boundary) extends straight, the maximum control acceleration G is set to 0.1 G. When the lane is curved, the maximum control acceleration G is set to 0.15 G which is greater than that when the lane is straight because it is necessary to change the behavior of the system vehicle greatly. These values of the maximum control acceleration G are preferably determined experimentally.

The value of the maximum control acceleration G when the lane departure control system 1 steers or direct the system vehicle parallel to the virtual line, that is, when the lane departure flag is being reset, may also be selected to be smaller than that when the lane departure control system 1 turns the system vehicle back to the center of the lane, that is, when the lane departure flag is being set. For example, the value of the maximum control acceleration G when the system vehicle is steered so as to run parallel to the virtual line may be selected to be substantially half that when the system vehicle is directed toward the center of the lane.

Figure 5A:
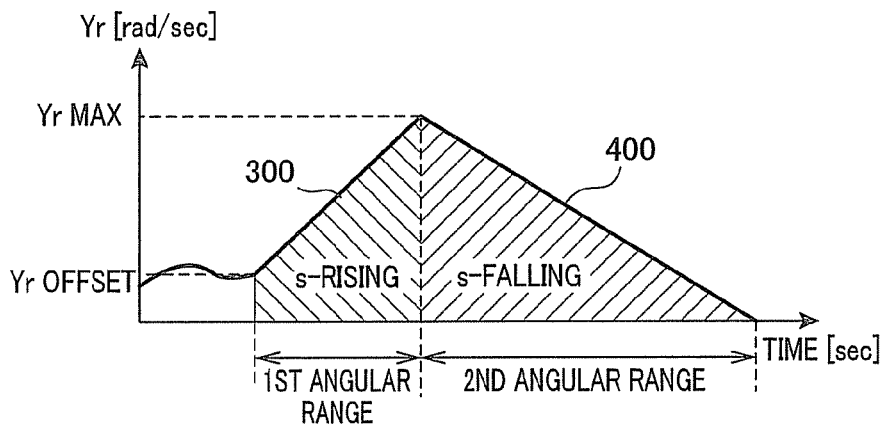
FIG. 5(a) is a view which demonstrates a schedule of a change in target yaw rate determined by the lane departure control system of FIG. 1(a) when the direction of a current yaw rate of a vehicle equipped with this system is the same as that steered by the lane departure control system.
Figure 5B:
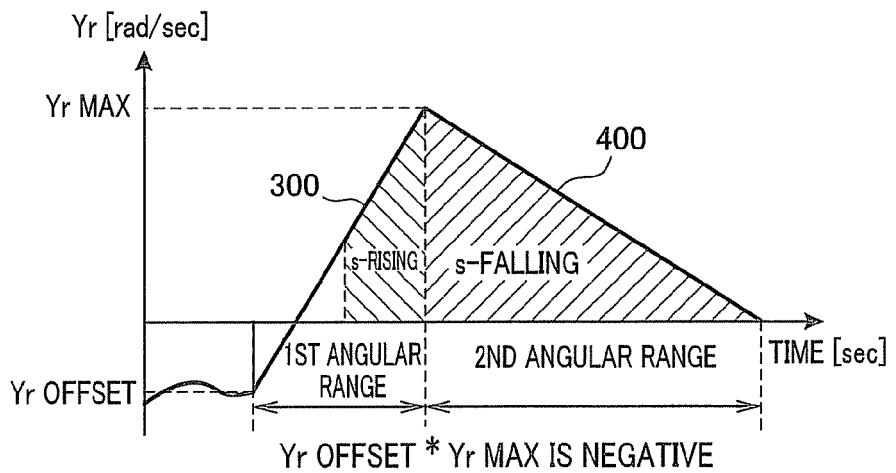
FIG. 5(b) is a view which demonstrates a schedule of a change in target yaw rate determined by the lane departure control system of FIG. 1(a) when the direction of a current yaw rate of a vehicle equipped with this system is opposite that steered by the lane departure control system.

Returning to FIG. 3, after the assist angle $\beta$ and the maximum control acceleration G (i.e., the upper limit of the target angular velocity of the system vehicle) are determined in step S180, the routine proceeds to step S190 wherein a triangle wave required to determine the target yaw rate of the system vehicle is defined mathematically in the manner, as demonstrated in FIGS. 5(a) and 5(b). FIGS. 5(a) and 5(b) represent a relation between a target value of the yaw rate and time elapsed after start of the lane departure control.

Specifically, a maximum target yaw rate when the travel direction of the system vehicle is to be changed to an angular direction of the assist angle $\beta$ is calculated based on the deviation angle $\alpha$. In order to minimize the length of time consumed in performing the lane departure control operation and the distance by which the system vehicle deviates from the lane boundary, the relation between the time (i.e., the control duration) and the target yaw rate is set logically in the form of a triangle wave.

Specifically, the target yaw rate is so set as to increase continuously at a given constant rate for a first controlled period of time and then decrease continuously at a given constant rate for a second controlled period of time. In other words, the target yaw rate is increased linearly for a first angular range and then decreased linearly for a second angular range. Each of the first and second angular range is determined as a function of a yaw rate offset YrOffset (which will be described later in detail), a rate of change in the target yaw rate, and the maximum target yaw rate.

Figure 8:
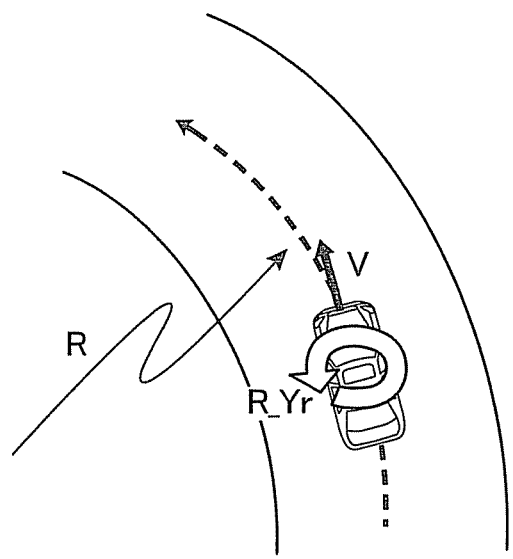
FIG. 8 is a view for explaining how to calculate a target yaw rate of a vehicle when the vehicle is running in a curved lane.

The target yaw rate is so determined that the value of integral of the target yaw rate over a lane departure control duration will be the controlled angle ($\alpha+\beta$). The lane departure control duration is a period of time (i.e., the sum of the first and second controlled period of times) for which the system vehicle is steered automatically by the controlled angle. Further, the target yaw rate is also determined so that when the travel direction (i.e., the heading angle) of the system vehicle has been changed toward the center of the lane by the controlled angle at given constant rates of change in yaw rate, that is, when the lane departure control is finished, the target yaw rate will be a curving yaw rate R_Yr. The curving yaw rate R_Yr is, as illustrated in FIG. 8, a yaw rate of the system vehicle required to run along a curve (i.e., the curved lane boundary) of the road. The curving yaw rate R_Yr is calculated based on the radius R of curvature of the lane and the speed V of the system vehicle. The radius R of curvature may be derived using, for example, the image captured by the camera 20 in the known manner. Note that when the system vehicle is running straight along the lane boundary, in other words, when the lane extends straight, the curving yaw rate R_Yr will be zero).

The maximum target yaw rate YrMax has a value, as illustrated in FIGS. 5(a) and 5(b), which is different between when the yaw rate offset YrOffset at the start of calculation of the target yaw rate, is positive in sign (i.e., the system vehicle is turning right in this embodiment) and when it is negative in sign (i.e., the system vehicle is turning left in this embodiment). The yaw rate offset YrOffset is a sensor output YrSensor minus the curving yaw rate R_Yr (i.e., YrOffset=YrSensor−R_Yr). The sensor output YrSensor represents a current yaw rate of the system vehicle, as measured by the yaw rate sensor 22. Consequently, when the system vehicle is running straight along the lane boundary, the curving yaw rate R_Yr is zero, so that the yaw rate offset YrOffset will be identical with the sensor output YrSensor. In other words, the yaw rate offset YrOffset represents a yaw rate of the system vehicle relative to the lane boundary. When the sensor output YrSensor indicates a yaw rate of the system vehicle when running along the curve (i.e., the curved lane boundary), the yaw rate offset YrOffset will be zero.

The maximum target yaw rate YrMax is given by the following equations.

When YrOffset*YrMax is positive, $$(YrMax+YrOffset)(YrMax-YrOffset)/2*reqYrJerkrising+YrMax^2/(2*reqYrJerkfalling)=\alpha+\beta$$

Thus, $$YrMax^2=\{2*(\alpha+\beta)+YrOffset^2/reqYrJerkrising\}/\{(1/reqYrJerkrising)+(1/reqYrJerkfalling)\} \quad (1)$$

When YrOffset*YrMax is negative, $$YrOffset^2/(2*reqYrJerkrising)+(YrMax/reqYrJerkrising)+YrMax^2/(2*reqYrJerkfalling)=\alpha+\beta$$

Thus, $$YrMax^2=\{2*(\alpha+\beta)-YrOffset^2/reqYrJerkrising\}/\{(1/reqYrJerkrising)+(1/reqYrJerkfalling)\} \quad (2)$$

where reqYrJerkrising is a rate at which the target yaw rate is to be increased, and reqYrJerkfalling is a rate at which the target yaw rate is to be decreased.

From Eq. (1) or (2), the vertex of the triangle wave (i.e., the maximum target yaw rate YrMax) is derived.

Figure 6:
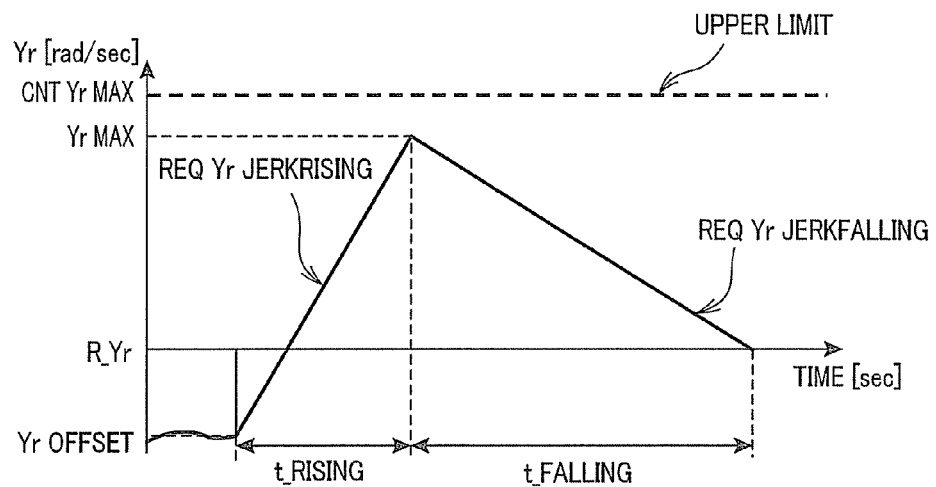
FIG. 6 is a view which shows a schedule of a change in target yaw rate when a maximum target yaw rate, as determined, is lower than an upper limit.

The routine then proceeds to step S210 wherein it is determined whether the vertex of the triangle wave (i.e., the maximum target yaw rate YrMax), as calculated in step S190, is greater than an upper limit cntYrMax or not. The upper limit cntYrMax is, as described above, given by the maximum control acceleration G/the speed V of the system vehicle. If a NO answer is obtained meaning that the vertex of the triangle wave is not greater than the upper limit cntYrMax, then the routine proceeds to step S230 wherein control durations in which the target yaw rate increases and then decreases, as illustrated in FIG. 6, in the form of a triangle wave are determined. Specifically, a control duration t_rising (i.e., the first controlled period of time in FIGS. 5(a) and 5(b)) in which the target yaw rate continues to be increased at the rate reqYrJerkrising, and a control duration t_falling (i.e., the second controlled period of time in FIGS. 5(a) and 5(b)) in which the target yaw rate continues to be decreased at the rate reqYRJerkfalling are determined according to the following equations.

$$t\_rising=(YrOffset/reqYrJerkrising)+(YrMax/reqYrJerkrising) \quad (3)$$

$$t\_falling=YrMax/reqYrJerkfalling \quad (4)$$

Figure 7:
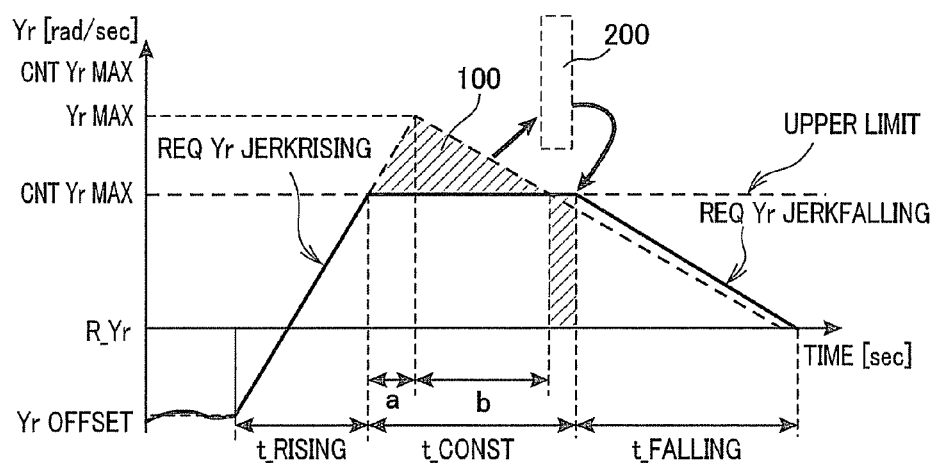
FIG. 7 is a view which shows a schedule of a change in target yaw rate when a maximum target yaw rate, as determined, exceeds an upper limit.

As apparent from the above discussion, when the system vehicle is determined to be about to deviate from the lane, the arithmetic circuit 10 acquires the instantaneous value (i.e., YrSensor) of the yaw rate of the system vehicle to determine the yaw rate offset YrOffset, mathematically draws or calculates a wave, as illustrated in FIG. 6 or 7, in the Cartesian coordinate system defined by a first coordinate axis representing time (i.e., the lane departure control duration) and a second coordinate axis representing the value of the target yaw rate. The wave extends from a first point indicating the yaw rate offset YrOffset and terminates at a second point where the target yaw rate is identical with the curving yaw rate R_Yr. The wave is also formed so that the value of integral of the target yaw rate over the lane departure control duration will be the controlled angle ($\alpha+\beta$), in other words, a total area of a figure defined by the wave, the first coordinate axis, and a segment extending from the first point to the first coordinate axis parallel to the second coordinate axis is the sum of the deviation angle $\alpha$ and the assist angle $\beta$. The wave includes, as can be seen from FIGS. 5(a) and 5(b), at least two straight segments: one segment 300 indicating the target yaw rate which is increased at a constant rate, and the other segment 400 indicating the target yaw rate which is decreased at a constant rate. In other words, the wave is drawn in the form of a triangle along with the first coordinate axis (i.e., the time axis). In each of the examples of FIGS. 5(a) and 5(b), the sum of an area S rising and an area S_falling corresponds to the sum of the deviation angle $\alpha$ and the assist angle $\beta$.

If a YES answer is obtained in step S210 meaning that the vertex (i.e., the maximum target yaw rate) of the triangle wave is greater than the upper limit cntYrMax, then the routine proceeds to step S220 wherein the control durations t_rising and t_falling in which the target yaw rate is increased and then decreased in the form of a trapezoidal wave where the value of the target yaw rate is kept below the upper limit cntYrMax are calculated. Specifically, the trapezoidal wave is, as illustrated in FIG. 7, defined by removing a triangle portion 100 of the area of the triangle wave of FIG. 6 where the value of the target yaw rate exceeds the upper limit cntYrMax and then adding the triangle portion 100 as an additional length of the control duration t_const which is represented by a rectangular portion 200. Therefore, the value of the target yaw rate first increases for the control duration t_rising, is kept at the upper limit cntYrMax for the control duration t_const, and then decreases for the control duration t_falling in the form of the trapezoidal wave.

$$t\_rising = (YrOffset/reqYrJerkrising) + (YrMax/reqYrJerkrising) \quad (5)$$

$$\begin{aligned} t\_const = &\\ a + b + (\text{portion } 100) = &\{(YrMax - cntYMax)/reqYrJerkrising\} + \\ &\{(YrMax - cntYrMax)/reqYrJerkfalling\} + \\ (\text{portion } 200)/cntYrMax = &(YrMax - cntYrMax) \\ &\{(1/reqYrJerkrising) + (1/reqYrJerkfalling)\} + \\ &\{(a+b)(YrMax - cntYrMax)/2\}/cntYrMax = \\ &(YrMax - cntYrMax) \\ &\{(1/reqYrJerkrising) + (1/reqYrJerkfalling)\} \\ &\{1 + [\{(YrMax - cntYrMax)/2'cntYrMax\}] \end{aligned} \quad (6)$$

$$t\_falling = YrMax/reqYrJerkfalling \quad (7)$$

After step S230 or step S220, the routine then proceeds to step S240 wherein the value of the target yaw rate is calculated for each of the control durations t_rising and t_falling, as derived in step S220 or S230. The target yaw rate is outputted to the steering controller 30. The steering controller 30, as described above, outputs a torque control signal to the steering mechanism 40 such as an electric power steering device to steer the system vehicle at the target yaw rate through the controlled angle. Specifically, the arithmetic circuit 10 outputs the target yaw rate which increases at a given constant rate in the control duration t_rising, remains unchanged in the control duration t_const, and then decreases at given constant rate in the control duration t_falling. The rates of change in target yaw rate in the control durations t_rising and t_falling, as described above, may be different from or equal to each other.

If a YES answer is obtained in step S160, that is, when the system vehicle is now approaching the virtual line after having been steered by the controlled angle ($\alpha+\beta$), the arithmetic circuit 10, as described above, enters the second steering control mode to calculate the correction angle $\gamma$ in the same manner, as described in steps S180 to S220. Specifically, the arithmetic circuit 10 sets the assist angle $\beta$ to zero (0) and processes the correction angle $\gamma$ as the controlled angle (=deviation angle $\alpha$). The arithmetic circuit 10 changes the target yaw rate in the form of a triangle wave or a trapezoidal wave (see FIG. 2). The target yaw rate is, like in the first steering control mode, kept below the upper limit cntYrMax2. The absolute value of the upper limit cntYrMax2 is, as described above, set lower than that of the upper limit cntYrMax1. Note that the upper limit cntYrMax1 in FIG. 2 is the upper limit cntYrMax, as described in the flowchart of FIG. 3, which is used in the first steering control mode to steer the system vehicle away from the left lane boundary in the example of FIG. 1(b), while the upper limit cntYrMax2 is the upper limit cntYrMcvc which is used in the second steering control mode to direct the system vehicle parallel to the virtual line. When steering the system vehicle through the correction angle $\gamma$, the arithmetic circuit 10, like in the first steering control mode, changes the target yaw rate at constant rates in at least two angular ranges (i.e., the first and second angular ranges in FIGS. 5(a) and 5(b)), thereby directing the system vehicle along the virtual line, thus providing a comfortable feeling to the driver.

When the lane departure control flag is in the reset state, and the lane departure control is completed (i.e., upon expiry of the control duration t_falling) or the travel direction of the system vehicle has become parallel to the virtual line (e.g., the angle between the travel direction of the system vehicle and the virtual line has fallen within ±0.5 deg.), the arithmetic circuit 10 reset or clear the lane departure control flag to terminate the lane departure control.

As apparent from the above discussion, the lane departure control system 1 (i.e., the arithmetic circuit 10) works to determine whether there is a high possibility that the system vehicle will depart unintentionally from the lane or not and, if it is determined that there is such a possibility, enter the first steering control mode to calculate the controlled angle ($\alpha+\beta$) and a schedule of changing the target yaw rate, and then output a control signal indicative thereof to the steering controller 30 to steer the system vehicle toward the center of the lane in a feedforward control mode. The lane departure control system 1 increases and then decreases the target yaw rate at given constant rates at least in two angular ranges (i.e., the control durations t_rising and t_falling) according to the given schedule. The arithmetic circuit 10 may alternatively be engineered to control the steering of the system vehicle in a feedback control mode while monitoring an output of the yaw rate sensor 22.

The above control operations eliminate the need for calculating the yaw moment of the system vehicle in determining the target yaw rate and thus permit the lane departure control system 1 to be simplified in operation of the arithmetic circuit 10 to calculate the target yaw rate at which the system vehicle is steered automatically to eliminate the risk of departure from the lane.

The arithmetic circuit 10 derives the deviation angle $\alpha$ between the heading direction of the system vehicle and the lane boundary when the system vehicle is about to depart from the lane and the assist angle $\beta$ between the boundary line and the target angular direction in which the system vehicle is to be pointed and determines the sum of them as the controlled angle through which the system vehicle is to be steered toward the center of the lane. The assist angle $\beta$ is calculated as a function of the deviation angle $\alpha$ according to a predetermined algorithm. This results in simplified arithmetic operation to determine the controlled angle and the target yaw rate.

Further, the arithmetic circuit 10 sets the schedule of changing the target yaw rate so that the yaw rate of the system vehicle, as measured by the yaw rate sensor 22, will be the curving yaw rate R_Yr upon completion of steering of the system vehicle toward the center of the lane by the controlled angle. In other words, after the yaw rate of the system vehicle drops to the curving yaw rate R_Yr (or to zero when the lane extends straight), the driver is permitted to steer the system vehicle, thus eliminating an undesirable load on the driver to handle the system vehicle.

The lane departure control system 1 also determines the schedule of the changing of the target yaw rate in the first steering control mode so that the value of integral of the target yaw rate over the lane departure control duration will be the controlled angle ($\alpha+\beta$). Similarly, the lane departure control system 1 determines the schedule of changing the target yaw rate in the second steering control mode so that the value of integral of the target yaw rate over the lane departure control duration will be the correction angle $\gamma$. In other words, the lane departure control system 1, as described already, calculates the target yaw rate so that it changes in the form of either of the triangle wave or the trapezoidal wave. This facilitates the ease of calculating the target yaw rate at which the system vehicle is to be steered and also offers a sense of safety to the driver.

The lane departure control system 1 determines the target yaw rate as a function of a current yaw rate (i.e., the sensor output YrSensor) of the system vehicle, in other words, based on the yaw rate offset YrOffset, thereby ensuring the stability in running of the system vehicle in a transition to the automatic lane departure control mode.

After completion of the first steering control mode, the lane departure control system 1 enters the second steering control mode to determine the correction angle $\gamma$ between the heading direction of the system vehicle and the virtual line and steer the system vehicle by the correction angle $\gamma$ to direct it parallel to the virtual line. In the second steering control mode, the arithmetic circuit 10 keeps the target yaw rate below the second upper limit cntYrMax 2 (see FIG. 2) whose absolute value is smaller than that of the first upper limit cntYrMax1. In other words, the lane departure control system 1 sets the target yaw rate in the second steering control mode smaller than that in the first steering control mode, thereby alleviating an undesirable load on the driver and facilitating the ease of transition to the manual driving of the system vehicle made by the driver.

The arithmetic circuit 10, as described above, determines the assist angle $\beta$ as a function of the deviation angle $\alpha$. Specifically, the arithmetic circuit 10 acquires the deviation angle $\alpha$, determines the possibility of departure of the system vehicle from the lane. If such a lane departure possibility is determined to be high, the arithmetic circuit 10 calculates the assists angle $\beta$ in relation to the deviation angle $\alpha$, determines the sum of the deviation angle $\alpha$ and the assists angle $\beta$ as the controlled angle, and derives the target yaw rate at which the system vehicle is to be steered through the controlled angle. Unlike the prior art system designed to calculate the yaw moment, the lane departure control system 1 is engineered to control the lane departure of the system vehicle in a simplified way.

The arithmetic circuit 10 determines the assist angle $\beta$ to be smaller than or equal to the deviation angle $\alpha$, thereby avoiding a undesirable rapid change in heading direction of the system vehicle toward the center of the lane.

The arithmetic circuit 10 increases the assist angle $\beta$ with an increase in the deviation angle $\alpha$. This achieves rapid elimination of the lane departure of the system vehicle when the system vehicle is expected to deviate greatly from the lane, thereby ensuring the safety of the system vehicle.

The arithmetic circuit 10, as described above, linearly changes the target yaw rate at which the system vehicle is to be steered. Specifically, in each of the first and second steering control modes, the arithmetic circuit 10 increases the target yaw rate at a first constant rate and then decreases it at a second constant rate. The first and second constant rates may be set equal to each other. The absolute values of the first and second constant rates used in the second steering control mode are both smaller than those in the first steering control mode.

In other words, when the first steering control mode is entered to direct the heading direction of the system vehicle toward the center of the lane, the arithmetic circuit 10 changes the target yaw rate greatly to speed up the changing of the heading direction of the system vehicle, while when the second steering control mode is entered to make the system vehicle run parallel to the virtual line, the arithmetic circuit 10 needs not complete the changing of the heading direction quickly and thus changes the target yaw rate slowly, thereby minimizing an undesirable physical load on the driver of the system vehicle.

The lane departure control system 1 may be engineered as follows.

The arithmetic circuit 10, as described above, outputs the target yaw rate to the steering controller 30, but may be designed to send a signal indicative of a target steering angle sequentially which corresponds to the target yaw rate.

The relation between the deviation angle $\alpha$ and the assist angle $\beta$ may be expressed by a linear function or an exponential function in which the assist angle $\beta$ is increased monotonically with an increase in the deviation angle $\alpha$.

In the event of a failure in recognizing the lane boundary (e.g., the right lane marking in FIG. 1(b)) near the virtual line in the second steering control mode, the lane departure control system 1 may perform the following operations.

Figure 9:
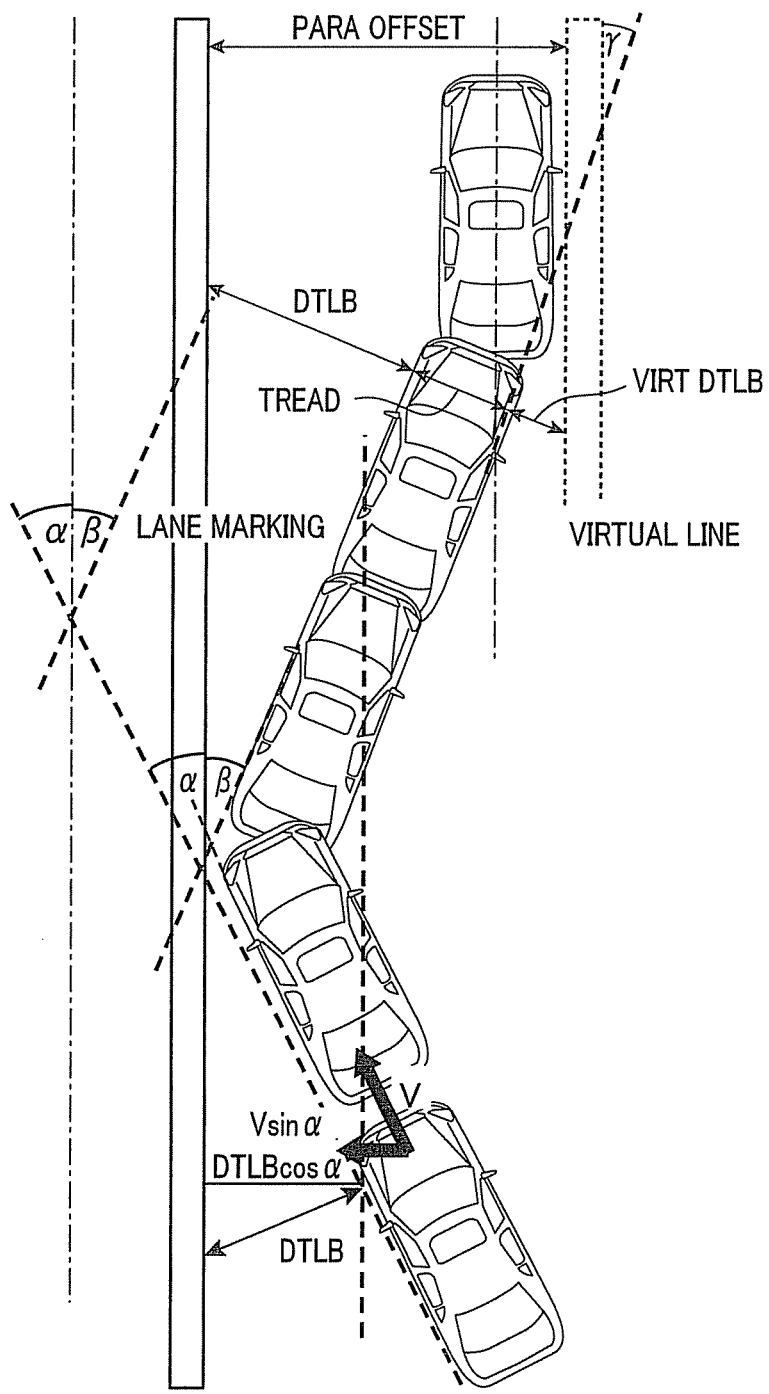
FIG. 9 is a bird's-eye view which shows how to determine a vehicle-to-virtual line distance.

The arithmetic circuit 10 calculates a vehicle-to-virtual line distance VirtDTLB, as illustrated in FIG. 9, between the right lane boundary and the system vehicle (e.g., the front right wheel) in the widthwise direction of the system vehicle on the basis of the left boundary line according to equation below.

$$\mathrm{Virt}DTLB=\mathrm{ParaOffset}/\cos\gamma-(\mathrm{Tread}+DTLB) \quad (8)$$

where ParaOffset is the distance between the far lane boundary and the virtual line, Tread is the distance (i.e., the axle track) between the centerline of two roadwheels (i.e., the front right and left wheels in FIG. 9) on the same axle, and DTLB is the distance between an outside one of the front wheels (e.g., the centerline of the outside front wheel) and the inner edge of the near lane boundary.

A TTLC (i.e. time-to-lane crossing) that is the time the system vehicle takes to cross the virtual line is given by $$TTLC = (VirtDTLB/\tan \gamma)/V \tag{9}$$

where V is the speed of the system vehicle.

Therefore, a yaw rate Req_Yr (i.e., the target yaw rate) required in the second steering control mode to direct the heading direction of the system vehicle parallel to the virtual line is obtained by equation below.

$$\begin{aligned} Req\_Yr &= \gamma/TTLC \\ &= V\gamma/(VirtDTLB/\tan\gamma) \end{aligned} \tag{10}$$

When the correction angle γ falls within a range of ±0.5 degrees or when the distance VirtDTLB drops below zero, the arithmetic circuit 10 may terminate the second steering control mode.

In step S180 of FIG. 3, the arithmetic circuit 10 may calculate the assist angle β so that a lateral speed Vx of the system vehicle in the first steering control mode may be constant (e.g., 0.3 m/sec.). The lateral speed Vx is the speed in a direction perpendicular to the lane boundary at which the system vehicle moves from the lane boundary to the virtual line. The assist angle β is given by equations below.

$$V^*\tan \beta = Vx \tag{11}$$

$$\beta = \alpha \tan(Vx/V) \tag{12}$$

Specifically, the arithmetic circuit 10 controls the movement of the system vehicle at the constant speed Vx relative to the lane boundary, thereby providing a sense of safety to the driver of the system vehicle.

The arithmetic circuit 10 may mathematically predict the lane departure distance that is, as described above, the interval in the widthwise direction of the lane between the current position of the system vehicle and a future position of the system vehicle which is estimated to deviate at a maximum distance from the lane boundary if the system vehicle continues to be steered through the controlled angle now determined.

Specifically, the arithmetic circuit 10 performs a lane departure control program of FIG. 10. The same step numbers, as employed in FIG. 3, refer to the same operations, and explanation thereof in detail will be omitted here. The waveform calculation in each of steps S310 and S350 is made in the same way as described in steps S190 to S230 of FIG. 3.

After step S310 in which the trapezoidal wave or the triangular wave is defined to determine the control durations t_rising and t_falling (i.e., steps S220 or S230), the routine proceeds to step S320 wherein the lane departure distance Xmax is calculated. The lane departure distance Xmax is, as described above, the interval in the widthwise direction of the lane (i.e., a direction perpendicular to the lane boundary or the virtual line) between the current position of the system vehicle and a future position of the system vehicle which is expected to be away at a maximum distance from the line 500, as illustrated in FIG. 1(*b*), drawn through the current position of the system vehicle parallel to the lane boundary (i.e., the direction in which the system vehicle is to be pointed positively).

The routine proceeds to step S330 wherein it is determined whether the system vehicle is expected to deviate from the lane boundary or not if the automatic steering operation continues to be performed on the system vehicle based on the controlled angle at the yaw rate, as derived in the waveform calculation in step S310. This determination is made by comparing the lane departure distance Xmax with the current or instantaneous distance between the system vehicle to the lane boundary (or the virtual line). Specifically, it is determined whether the lane departure distance Xmax is greater than the distance DTLB or not.

If a NO answer is obtained meaning that the system vehicle will not deviate from the lane, then the routine proceeds to step S240. Alternatively, if a YES answer is obtained, then the routine proceeds to step S340 wherein the assist angle β is corrected.

Specifically, the assist angle β is corrected using a correction factor K (>0) to derive an assist angle β' according to an equation below.

$$\beta' = \beta + K(X\max - DTLB) \tag{13}$$

The routine proceeds to step S350 wherein the same operations as in steps S210 and S220 or S230 are performed to calculate the control durations t_rising and t_falling and/or the control duration t_const. The routine then proceeds to step S240 wherein the same operation as in step S240 of FIG. 3 is performed to control the steering of the system vehicle through the steering controller 30.

Figure 11A:
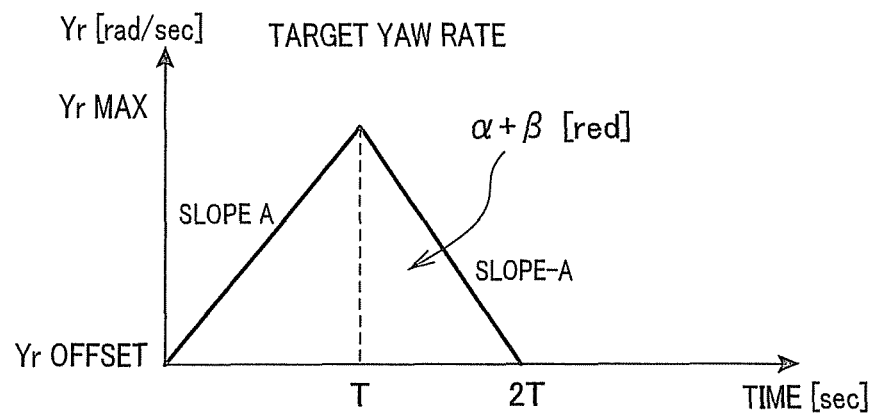
FIG. 11(a) is a graph which demonstrates a change in target yaw rate with time in a case where a maximum target yaw rate is less than an upper limit corresponding to a maximum control acceleration.
Figure 11B:
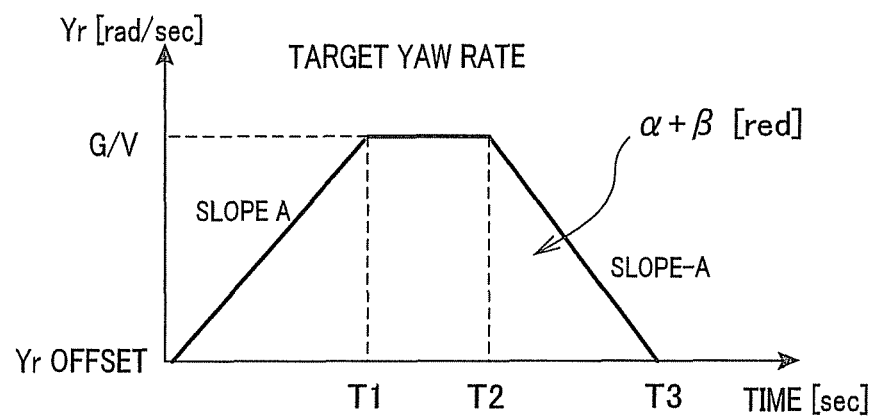
FIG. 11(b) is a graph which demonstrates a change in target yaw rate with time in a case where a maximum target yaw rate exceeds an upper limit corresponding to a maximum control acceleration.

How to calculate the lane departure distance Xmax will be described below. In the following discussion, the speed of the system vehicle is expressed by V m/s. The upper limit of lateral acceleration of the system vehicle (i.e., the maximum control acceleration) is expressed by G m/s². The rate of change in target yaw rate is expressed by A rad/s². FIG. 11(*a*) is a graph which demonstrates a change in target yaw rate (i.e., the required yaw rate) with time in a case where the maximum target yaw rate is less than an upper limit corresponding to the maximum control acceleration G. FIG. 11(*b*) is a graph which demonstrates a change in target yaw rate with time in a case where the maximum target yaw rate exceeds the upper limit.

In the example of FIG. 11(*a*), the arithmetic circuit 10 increases the target yaw rate at the change rate A from time 0 to time T and then decreases it at the change rate −A from time T to time T1. In the example of FIG. 11(*b*), the arithmetic circuit 10 increases the target yaw rate at the change rate A from time 0 to time T1, keeps it at a value of G/V from time T1 to time T2, and then decreases it at the change rate −A from time T2 to time T3.

The following discussion on how to calculate the lane departure distance Xmax will refer only to the example of FIG. 11(*a*) for the sake of simplicity of explanation. In equations below, "A" indicates the absolute value of the rate of change in target yaw rate. We believe that the following explanation enables persons of ordinary skill in the art to derive the lane departure distance Xmax even in the case where the absolute value of the rate of change in target yaw rate is different between when the target yaw rate is increased and when it is decreased, or where the target yaw rate is changed in the form of a trapezoidal wave, as illustrated in FIG. 11(*b*).

In the example of FIG. 11(*a*), equations (14) and (15), as shown below, are met.

$$Yr = At \tag{14}$$

where Yr is the target yaw rate.

In terms of an area of the curve (i.e., the triangle wave) indicating the target yaw rate, the following relation is satisfied.

$$T \cdot AT = \alpha + \beta \tag{15}$$

$$T=\sqrt{((\alpha+\beta)/A)} \quad (16)$$

The condition in which the target yaw rate is changed in the form of a triangle wave is $$G \le V \cdot Yr\text{Max} = VAT \quad (17)$$

Assuming that the deviation angle α is sufficiently small, the lateral acceleration gx of the system vehicle is given by $$gx = g \cdot \cos\alpha = g$$

Thus, $$\begin{aligned} gx &= -V \cdot Yr = -VAt & (t < T) \\ &= -VAT + VA(t-T) = VA(t-2T) & (T < t < 2T) \\ &= 0 & (2T < t) \end{aligned} \quad (18)$$

The lateral speed Vx is $$\begin{aligned} Vx &= \int gx = -1/2\, VAt^2 + V\sin\alpha & (t < T) \\ &= -1/2\, VAT^2 + V\sin\alpha + VA(-T(t-T) + 1/2(t-T)^2) \\ &= VA(1/2t^2 - 2Tt + T^2) + V\sin\alpha & (T < t < 2T) \\ &= -1/2VAT^2 + V\sin\alpha + VA\{-T(2T-T) + 1/2(2T-T)^2\} \\ &= -VAT^2 + V\sin\alpha & (2T < t) \end{aligned} \quad (19)$$

Thus, the lateral position x of the system vehicle is given by $$\begin{aligned} x &= \int vx = -1/6\, VAt^3 + V\sin\alpha\, t & (t < T) \\ &= -1/6VAT^3 + V\sin\alpha\, T - 1/2\, VAT^2(t-T) + \\ &\quad V\sin\alpha(t-T) - 1/2VAT(t-T)^2 + 1/6\, VA(t-T)^3 \\ &= VA(1/6t^3 - Tt^2 + T^2t - 1/3T^3) + V\sin\alpha t & (T < t < 2T) \\ &= -1/6\, VAT^3 + V\sin\alpha\, T - 1/2\, VAT^2(2T-T) + \\ &\quad V\sin\alpha(2T-T) - 1/2VAT(2T-T)^2 + \\ &\quad 1/6VA(2T-T)^3 + (-VAT^3 + V\sin\alpha)t \\ &= -VAT^3 + (-VAT^2 + V\sin\alpha)t & (2T < t) \end{aligned} \quad (20)$$

The time Tα when vx=0 is

When $\alpha < \beta$, $-\tfrac{1}{2}VAt^2 + V\sin\alpha = 0 \quad (21)$

Thus, $$T\alpha = \sqrt{(2\sin\alpha)/A} \quad (22)$$

When $\alpha > \beta$, $VA(\tfrac{1}{2}T\alpha^2 - 2T\cdot T\alpha + T^2) + V\sin\alpha = 0 \quad (23)$ Thus, $$T\alpha = \{2AT - \sqrt{(2A^2 \cdot T^2 - 2A\sin\alpha)}\}/A \quad (24)$$

Therefore, the lane departure distance Xmax is given by either of equations below.
The time t when x=Xmax is Tα.
Thus, when $a < \beta$,
$$X\max = -1/6\, VA\, T a^3 + V\sin a\, T a \quad (25)$$

when $a > \beta$,
$$X\max = VA(1/6\, Ta^3 - TTa^2 + T^2 Ta - 1/3\, T^3) + V\sin a\, Ta \quad (23)$$

Figure 12A:
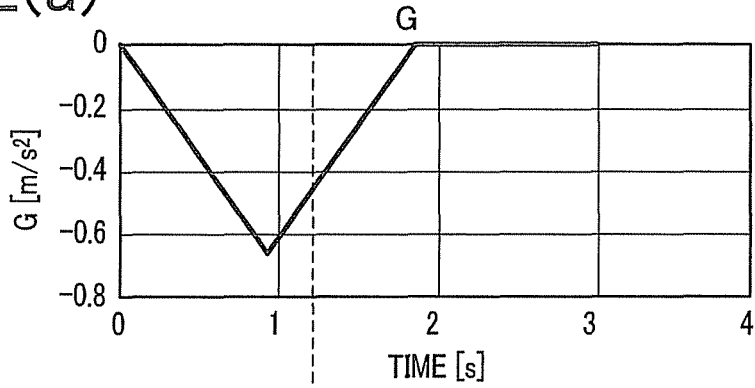
FIG. 12(a) is a graph which shows a change in lateral acceleration of a vehicle used in calculating a lane departure distance.
Figure 12B:
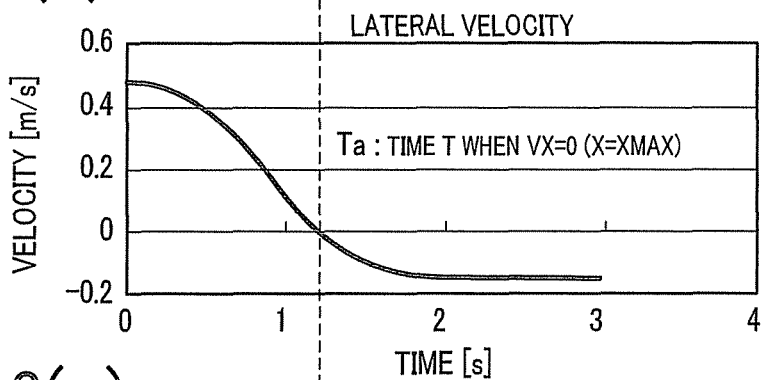
FIG. 12(b) is a graph which shows a change in speed of a vehicle used in calculating a lane departure distance.
Figure 12C:
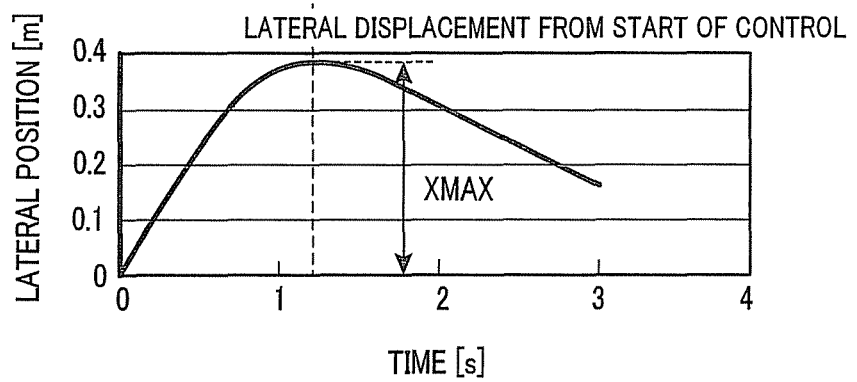
FIG. 12(c) is a graph which shows a lateral position of a vehicle used in calculating a lane departure distance.

When the speed V of the system vehicle is 100 km/h, and the deviation angle α is 1 degree, the execution of the above described lane departure control causes the system vehicle to undergo changes in lateral acceleration, as illustrated in FIG. 12(a), lateral speed, as illustrated in FIG. 12(b), and lateral position, as illustrated in FIG. 12(c), with time. FIG. 12(a) indicates a time-sequentially plotted change in lateral acceleration of the system vehicle, as derived according to Eq. (18). Similarly, FIG. 12(b) indicates a time-sequentially plotted change in lateral speed of the system vehicle, as derived according to Eq. (19). FIG. 12(c) indicates a time-sequentially change in lateral position of the system vehicle, as derived according to Eq. (20).

The value of the lane departure distance Xmax, as derived according to Eqs. (25) and (26), corresponds to an extremum (i.e., the maximum) of the curve of FIG. 12(c).

The arithmetic circuit 10, as described above, increases the assist angle β with an increase in lane departure distance Xmax to obtain a greater value of the corrected assist angle β', thus resulting in a quick return of the system vehicle toward the center of the lane.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For example, the programs in FIGS. 3 and 10 may be stored in a computer readable storage medium (e.g., a non-transitory medium). The medium may be, for example, but not limited to, an electric, magnetic, optical, infrared or semiconductor system, device or transmission medium.

The programs in the storage medium may be installed in a computer and executed to realize the lane departure control system 1.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A lane departure control apparatus for controlling a lane departure of a vehicle using a steering mechanism, the apparatus comprising:
    an angle determiner which determines a controlled angle between a direction in which the vehicle is heading within a given area of a lane on a road and a target angular direction in which the vehicle is to be pointed, wherein the angle determiner determines a correction angle between a direction in which the vehicle is now pointing and a virtual line, the virtual line being defined to extend parallel to a lane boundary of the lane; and
    a lane departure controller configured to operate in a first steering control mode and a second steering control mode following the first steering control mode, when the angle determiner determines that the vehicle is about to deviate from the given area of the lane, the lane departure controller enters the first steering control mode to acquire the controlled angle from the angle determiner and outputs a control signal to the steering mechanism to steer the vehicle toward a center of the given area of the lane by the controlled angle at a first yaw rate, when the angle determiner determines that the vehicle is to be traveling toward the virtual line, the lane departure controller enters the second steering control mode to acquire the correction angle from the angle determiner and outputs a control signal to the steering mechanism to steer the vehicle by the correction angle to orient the vehicle parallel to the virtual line at a second yaw rate,
    wherein the lane departure controller keeps an absolute value of the first yaw rate below a first upper limit in the first steering control mode and keeps an absolute value of the second yaw rate below a second upper limit that is less than the first upper limit in the second steering control mode.

2. The lane departure control apparatus as set forth in claim 1, wherein the lane departure controller calculates a deviation angle between the direction in which the vehicle is pointing and a boundary line which is provided to define the given area of the lane and also calculates an assist angle between the target angular direction of the vehicle in the first steering control mode and the boundary line, and wherein the correction angle is set to the sum of the deviation angle and the assist angle.

3. The lane departure control apparatus as set forth in claim 1, further comprising an electric power steering device which works as the steering mechanism to steer the vehicle in response to each of the control signals outputted form the lane departure controller.

4. The lane departure control apparatus as set forth in claim 1, further comprising an image capturing device which works as the angle determiner to capture an image of a road surface in a heading direction of the vehicle to determine the controlled angle.

5. The lane departure control apparatus as set forth in claim 1, wherein when the vehicle is expected to unintentionally leave the boundary line, the lane departure controller acquires an instantaneous value of a yaw rate of the vehicle to determine a yaw rate offset that is the instantaneous value of the yaw rate minus a curving yaw rate, and mathematically draws a wave in a Cartesian coordinate system defined by a first coordinate axis representing time and a second coordinate axis representing a target value of the first yaw rate at which the vehicle is to be steered, the curving yaw rate being a yaw rate of the vehicle which is required to curve around the boundary line and which is zero when the vehicle is running straight along the boundary line, the wave being defined to extend from a first point indicating the yaw rate offset and terminate at a second point where the target value of the first yaw rate becomes the curving yaw rate and also formed so that a value of integral of the target value of the first yaw rate over a lane departure control duration for which the vehicle is to be steered in the first steering control mode will be the controlled angle, and wherein the lane departure controller steers the vehicle at the target value of the first yaw rate which changes according to the wave.

6. The lane departure control apparatus as set forth in claim 5, wherein the wave includes at least two segments: a first segment indicating the target value of the first yaw rate which is increased at a constant rate, and a second segment indicating the target value of the first yaw rate which is decreased at a constant rate.

7. The lane departure control apparatus as set forth in claim 1, wherein when the vehicle is expected to unintentionally leave the boundary line, the lane departure controller acquires an instantaneous value of a yaw rate of the vehicle to determine a yaw rate offset that is the instantaneous value of the yaw rate minus a curving yaw rate, and mathematically draws a wave in a Cartesian coordinate system defined by a first coordinate axis representing time and a second coordinate axis representing a target value of the second yaw rate at which the vehicle is to be steered, the curving yaw rate being a yaw rate of the vehicle which is required to curve around the boundary line and which is zero when the vehicle is running straight along the boundary line, the wave being defined to extend from a first point indicating the yaw rate offset and terminate at a second point where the target value of the second yaw rate becomes the curving yaw rate and also formed so that a value of integral of the target value of the second yaw rate over a lane departure control duration for which the vehicle is to be steered in the second steering control mode will be the correction angle, and wherein the lane departure controller steers the vehicle at the target value of the second yaw rate which changes according to the wave.

8. The lane departure control apparatus as set forth in claim 7, wherein the wave includes at least two segments: a first segment indicating the target value of the second yaw rate which is increased at a constant rate, and a second segment indicating the target value of the second yaw rate which is decreased at a constant rate.

9. A non-transitory computer readable medium containing program instructions executed by a controller to control a lane departure control apparatus, the non-transitory computer readable medium comprising:
    program instructions for an angle determiner which determines a controlled angle between a direction in which the vehicle is heading within a given area of a lane on a road and a target angular direction in which the vehicle is to be pointed,
    wherein the angle determiner determines a correction angle between a direction in which the vehicle is now pointing and a virtual line, the virtual line being defined to extend parallel to a lane boundary of the lane; and
    program instructions for a lane departure controller configured to operate in a first steering control mode and a second steering control mode following the first steering control mode, when the angle determiner determines that the vehicle is about to deviate from the given area of the lane, the lane departure controller enters the first steering control mode to acquire the controlled angle from the angle determiner and outputs a control signal to the steering mechanism to steer the vehicle toward a center of the given area of the lane by the controlled angle at a first yaw rate, when the angle determiner determines that the vehicle is to be traveling toward the virtual line, the lane departure controller enters the second steering control mode to acquire the correction angle from the angle determiner and outputs a control signal to the steering mechanism to steer the vehicle by the correction angle to orient the vehicle parallel to the virtual line at a second yaw rate, wherein the lane departure controller keeps an absolute value of the first yaw rate below a first upper limit in the first steering control mode and keeps an absolute value of the second yaw rate below a second upper limit that is less than the first upper limit in the second steering control mode.

* * * * *